United States Patent [19]

Kamo

[11] Patent Number: 4,495,907

[45] Date of Patent: Jan. 29, 1985

[54] COMBUSTION CHAMBER COMPONENTS FOR INTERNAL COMBUSTION ENGINES

[75] Inventor: Roy Kamo, Columbus, Ind.

[73] Assignee: Cummins Engine Company, Inc., Columbus, Ind.

[21] Appl. No.: 458,804

[22] Filed: Jan. 18, 1983

[51] Int. Cl.[3] .............................................. B32B 15/04

[52] U.S. Cl. ................................ 123/193 C; 123/669; 252/62; 427/230; 428/633; 428/472; 501/152

[58] Field of Search ..... 123/193 CH, 193 C, 193 CP, 123/668, 669; 427/230, 399; 501/152; 252/62; 428/472, 633

[56] References Cited

U.S. PATENT DOCUMENTS

| | | | |
|---|---|---|---|
| 1,490,849 | 4/1924 | Philip | 123/193 P |
| 2,075,388 | 3/1937 | DeCloud | 123/669 |
| 2,926,649 | 3/1960 | Hicks | 123/668 |
| 3,620,137 | 11/1971 | Prasse | 123/193 C |
| 3,684,743 | 8/1972 | Morotsky et al. | 123/193 C |
| 3,719,519 | 3/1973 | Perugini | 428/557 |
| 3,911,891 | 10/1975 | Dowell | 123/669 |
| 3,956,531 | 5/1976 | Church et al. | 427/226 |
| 4,044,217 | 8/1977 | Otsuki et al. | 123/193 C |
| 4,055,705 | 10/1977 | Stecura et al. | 428/633 |
| 4,117,868 | 10/1978 | Pignocco et al. | 138/146 |

OTHER PUBLICATIONS

"Development of Surface Coatings for Air-Lubricated, Compliant Journal Bearings to 650° C.", Bharat Bhushan and Stanley Gray, *Mechanical Technology Incorporated,* Latham, N.Y.; 10-1978.

*Primary Examiner*—Craig R. Feinberg
*Assistant Examiner*—David A. Okonsky
*Attorney, Agent, or Firm*—Neuman, Williams, Anderson & Olson

[57] ABSTRACT

Combustion chamber defining components such as cylinder liners in internal combustion engines are composed of a plurality of metal oxides which combine to impart good wear resistance and thermally insulative characteristics.

7 Claims, 3 Drawing Figures

COMBUSTION CHAMBER COMPONENTS FOR INTERNAL COMBUSTION ENGINES

This invention relates to improvements in internal combustion engines and specifically to improvements in components defining the combustion chambers within said engines.

The surfaces defining the combustion chamber in internal combustion engines, and specifically the cylinder wall defining the bore for the piston, are subject not only to abrasion and wear, but also to high temperatures on the order of 1500° to 1800° F. It is desired that the cylinder walls exhibit low heat conductivity so as to improve the thermal efficiency of the engine and to decrease the amount of unburned hydrocarbons emitted into the atmosphere via the exhaust gas. Reduction of heat transfer from the chamber reduces the cooling requirements of the engine. Also, when the exhaust system of the engine involves a catalytic converter to purify the exhaust gas it is desirable to minimize lowering of the exhaust gas temperature prior to its entrance into the converter which functions more efficiently at high temperatures.

To lower the heat conductivity of internal combustion engine cylinders it has been proposed to form a generally monolithic ceramic layer on the bore defining wall or piston sleeve. This expedient involves serious problems in that the ceramic layer tends to crack, break and separate from the metal surface during operation. Also, to enhance wear resistance of the cylinders it has been proposed to plate the cylinder liner or piston sleeve with hard, wear resisting materials such as chromium or metal alloys having greater wear resistance than the conventionally used gray iron castings. However, such liner sleeves are very expensive and difficult to hone.

It is an object of the invention to provide a method for forming components defining a combustion chamber in internal combustion engines having unique and highly advantageous thermal insulating and wear resistance characteristics.

It is another object of this invention to provide combustion chamber defining components for internal combustion engines which significantly reduce requirements for cooling the engines.

It is a further object of the invention to provide a cylinder liner for internal combustion engines.

It is still another object of the invention to provide a method for forming cylinder liners for internal combustion engines having excepionally high resistance to wear and low heat conductivity.

In accordance with this invention, combustion chamber defining components in internal combustion engines are composed of a plurality of metal oxides which combine to impart good wear resistance and thermally insulative characteristics thereto. As used herein, a combustion chamber defining component is a component which is directly exposed to a combustion chamber of an internal combustion engine and includes components such as piston walls, cylinder liners, cylinder heads, exhaust port walls and the top portions or crowns of pistons. The wear-resisting and thermally insulative engine components according to this invention are formed by applying to the component substrate a layer of a thermally insulative metal oxide material followed by impregnation thereof with a solution of a soluble chromium compound convertible to chromium oxide by heating.

The invention will be further described in connection with a cylinder liner or sleeve, with it being understood that other components of an internal combustion engine which are exposed to combustion zone temperatures and gases are likewise formed. Thus, FIG. 1 is a fragmentary cross-sectional view of a cylinder liner formed in accordance with the invention.

Figure 1:
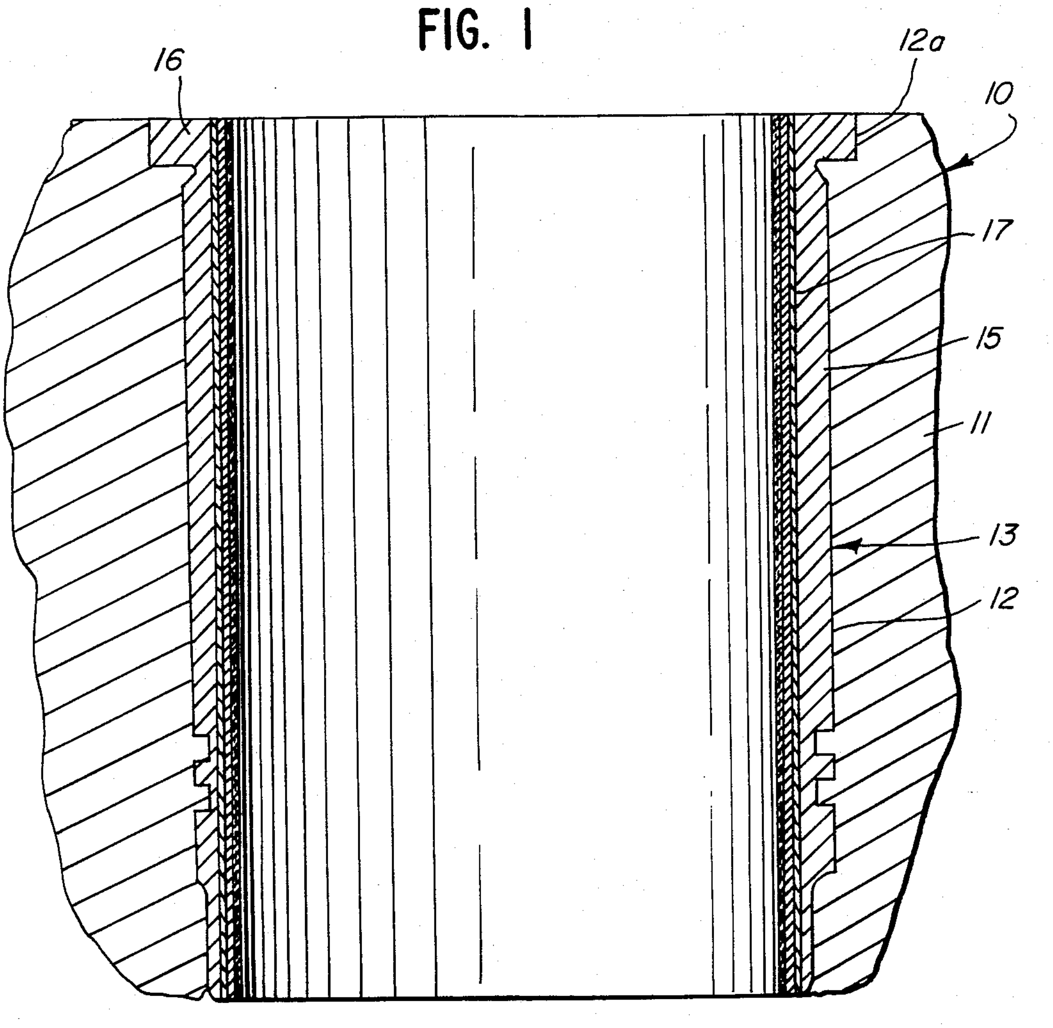

In FIG. 1 the numeral 10 designates generally a portion of a block 11 of an internal combustion engine having a bore 12 lined with a cylinder liner 13 of this invention. The cylinder liner 13 is a cast iron tube 15 with an outturned flange 16 at the top end thereof. The tube 15 is pressed into the bore 12 of the engine block 11 and the flange 16 is seated in a counterbore **12*a* of the top of the engine block. The inner surface 17 of the liner 13 is bored out to accommodate the thermally insulative and wear resistance components applied thereto in accordance with this invention while providing a cylinder liner having uniform and proper inner dimensions for slidable movement of the piston therein. The depth to which the inner surface 17 of the liner 13 is bored can be varied, but a bore depth of from about 0.005 inch to 0.125 inch is generally suitable. Illustratively, the inner surface 17** of the liner is bored out to a radius depth of about 0.03 inches.

After boring out the inner surface 17, the liner 13 is then treated to roughen the surface so as to promote adhesion. This surface preparation can advantageously be accomplished by sand blasting or similar surface roughening operations. Then, if necessary, the surface is degreased with a solvent such as gasoline and preferably is cleaned using ultrasonic cleaning techniques as are known.

While optional, it is generally preferred to apply a bonding material to the roughened and clean metal surface. Suitable bonding materials include, for example, Nichrome, a commercially available alloy comprised of nickel (60%), iron (25%) and chromium (15%), and NiCrALY, which is an alloy of nickel, chromium, aluminum and yttrium available from Alloy Metals Inc., Troy, Mich., containing about 16.2% chromium, 5.5% aluminum, 0.6% yttrium with the balance being nickel, and the like. The bond coat material is applied to the surface 17 to a thickness of about 0.002 to 0.005 inch by plasma spraying, clodding, slurry spray and sintering or other known techniques.

After preparation of the bored out surface and preferably after application of the bond coat, a layer of a thermally insulative material is applied thereto. The thermally insulative material can be a reflective metal oxide such as zirconium oxide, aluminum oxide, chromium oxide and the like. Preferred thermally insulative materials are yttria stabilized zirconium oxide ($ZrO_2$) or magnesia stabilized zirconium oxide such as described in U.S. Pat. No. 4,055,705. The preferred yttria stabilized zirconium oxide or other thermally insulative material is applied to a thickness generally of from about 0.015 to 0.110 inches by plasma or flame spraying or the like. A layer thickness of yttria stabilized zirconium oxide of about 0.020 to 0.023 inch generally provides very good insulative characteristics. The thickness of the thermally insulative layer can be varied to achieve a desired insulative effect. A thicker thermal barrier coating or a graded coating will generally provide greater resistance to thermal fatigue caused by thermal expansion.

After application of the thermally insulative material in accordance with one embodiment of the invention, the surface is then impregnated with a solution of a soluble chromium compound which is convertible by heat to a chromium oxide. Impregnation with a soluble chromium compound is an important feature of the present invention. By impregnating with a solution of a soluble chromium compound, chromium oxide particles are dispersed wholly or partially within the thermal insulating layer rather than merely forming a surface coating thereon as would be the case if chromium oxide were applied as a surface coating such as by flame or plasma coating. Impregnation is accomplished by contacting, such as by spraying or dipping, the surface one or more times with a liquid solution of a soluble chromium compound which upon heating to a relatively high temperature is converted to the insoluble chromium oxide. After impregnation with the soluble chromium compound, heating is employed to convert the chromium to its oxide.

U.S. Pat. Nos. 3,944,683 and 3,956,531 to Church et al. disclose methods for impregnating bodies with chromium compounds convertible to chromium oxides on heating and the disclosure of these patents is incorporated herein. A particularly preferred method for impregnating the surfaces with a chromium compound is disclosed in U.S. Pat. No. 3,956,531 wherein the surface is impregnated with a solution of soluble chromium compound capable of being converted to chromium oxide upon heating. The impregnated surface is then dried and cured by heating the same to a temperature sufficient to convert the chromium compound in situ to chromium oxide. The impregnation and curing steps are repeated at least once and preferably several times to densify, harden and strengthen the impregnated body. The soluble chromium compounds which can be used according to the patented method include water solutions of chromic anhydride ($CrO_3$), usually called chromic acid when mixed with water ($H_2CrO_4$); chromium chloride ($CrCl_3.xH_2O$); chromium nitrate [$Cr(No_3)_3.6H_2O$]; chromium acetate ($Cr(OAC)_3.4H_2O$); chromium sulfate ($(Cr_2SO_4)_3.15H_2O$); etc. Also included are a wide variety of dichromates and chromates such as zinc dichromate; magnesium chromate; and mixtures of chromates with chromic acid. A variety of more complex soluble chromium compounds is also included that can perhaps be best categorized by the generalized formula $xCrO_2.yCr_2O_3.zH_2O$ which are chromic chromate complexes as set forth in the American Chemical Society Monograph Series on Chromium, Volume 1, entitled "Chemistry of Chromium and its Compounds", Marvin J. Udy, Reinhold Publishing Corporation, New York, N.Y., copyright 1956, page 292, wherein chromium is present both in a trivalent cationic state and in a hexavalent anionic state. These are normally prepared by reducing chromic acid with some other chemical such as tartaric acid, carbon, formic acid and the like. A second method is to dissolve $Cr_2O_3$ or $Cr_2O_3.xH_2O$ or chromium hydroxide in chromic acid.

All of the chromium binder compounds are normally used in relatively concentrated form in order to achieve maximum chromium oxide bonding and densification. Dilute solutions may have a tendency to migrate toward the surface of a porous part causing a surface hardening condition. For certain applications, of course, this may be desirable. While in most cases water is used as the preferred solvent for the soluble chromium compounds, others may often be used, such as alcohols, like isopropyl, methyl and the like, N-N, dimethyl formide and the like.

Upon curing at a temperature preferably in excess of 600° F. or higher these soluble chromium compounds will be converted to a chromium oxide. For example, with increasing temperature chromic acid ($H_2CrO_4$) will first lose its water and the chromium anhydride ($CrO_3$) that remains will then, as the temperaure is further raised, begin to lose oxygen until at about 600° F. and higher, will convert to chromium oxide of the refractory form ($Cr_2O_3$ or $Cr_2O_3.xH_2O$). The same situation exists for the partially reacted soluble, complex, chromic acid form ($xCrO_3.yCr_2O_3.zH_2O$) discussed earlier. Chromium compounds such as the chlorides, sulfates, acetates, etc. will also convert to $Cr_2O_3$ by heating to a suitable temperature. The chromates all require a higher temperature to convert to the oxide form (that is to a chromite or a chromite plus $Cr_2O_3$) than does chromic acid by itself.

Figure 2:
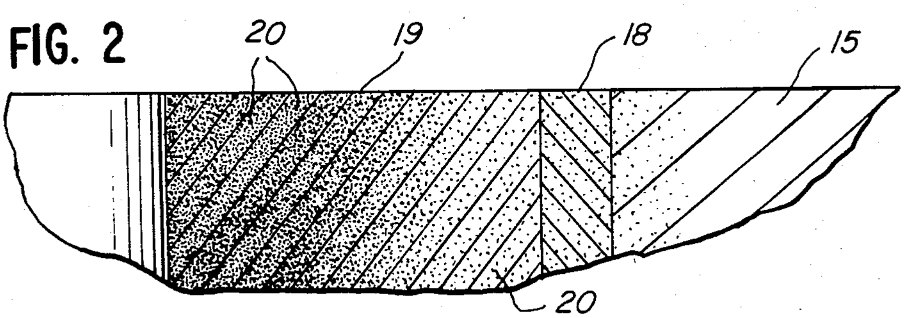
FIG. 2 is a partial enlarged view of the cylinder liner of FIG. 1 showing the composite structure of the liner formed in accordance with one embodiment of the invention.

When the thermally insulative layer is directly impregnated with a solution of a soluble chromium compound it is preferred to conduct the impregnation in such manner that the chromium solution penetrates substantially through the insulative layer and contacts the cast iron tube 15. This deep impregnation can be accomplished by repeating the impregnation and curing steps as is necessary. By such deep impregnation a very strong bond is formed which is believed to be due to a chemical reaction of the chromium with the iron substrate to form iron chromate. The density of the chromic oxide particles is greater at the surface, as shown in FIG. 2, and is sufficient to effectively seal the surface from penetration by fuels or lubricating oil or other contaminants. In FIG. 2, the numeral 18 indicates the bond coat applied to the cast iron tube 15 and the numeral 19 indicates the thermally insulative layer applied over the bond coat. Numeral 20 indicates chromium oxide particles, some of which are in contact with the cast iron tube 15.

A preferred procedure for preparing a cylinder liner as shown in FIG. 2 is to bore out the inner surface of the liner and clean the surface such as by sand blasting. Then a bonding material such as Nichrome is applied to the clean surface to a thickness of approximately 0.002 inch. Then a graded layer of thermally insulative material, such as yttrium stabilized zirconium oxide is applied by a flame spraying. The liner is then machined to desired dimension. Impregnation of the cylinder liner follows and is accomplished by dipping it in an aqueous solution of chromic acid. Heating the cylinder liner to a temperature of about 900° F. converts the chromic acid to chromic oxide. The impregnation and heating cycles are repeated 5 or 6 times to effect penetration of the impregnating solution. The cylinder liner can then be honed, if desired.

Figure 3:
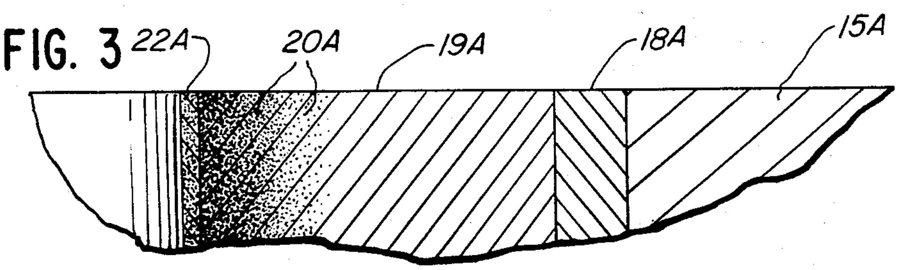
FIG. 3 is a partial enlarged view of the cylinder liner of FIG. 1 showing the composite structure of the liner formed in accordance with another embodiment of the invention.

In an alternative embodiment of the invention, prior to impregnation with a soluble chromium compound the cylinder liner having a thermally insulative material thereon is contacted, such as by spraying or dipping with a liquid containing silica (silicon dioxide), chromium oxide and aluminum oxide in a liquid carrier such as zinc, chromate and the like. A preferred barrier coating is one containing 300 grams silica acid and 54 grams aluminum oxide in a liquid carrier composed of 188 grams zinc chromate and 586 grams of distilled water. After applying this barrier coating, it is heated to a temperature on the order of 900° to 1000° F. to deposit on the surface of the thermally insulative layer a barrier coating comprised of silica, chromium and aluminum (SCA). The SCA barrier coating is applied to a thickness of about 0.002 to 0.005 inch and one or more application and heating cycles may be employed to obtain the desired thickness. Impregnation with a solution of a soluble chromium compound is then carried out. By applying the SCA barrier coating prior to impregnation with the soluble chromium compound, the extent of penetration of the impregnant into the thermally insulative layer is lessened as shown in FIG. 3. In FIG. 3, the numeral 18A indicates the bond coat applied to the cast iron tube 15A and the numeral 19A indicates the thermally insulative layer applied over the bond coat. Numeral 20A indicates the chromium oxide particles which are dispersed only partially within the insulative layer with the density being greater near the SCA barrier coating 22A.

A preferred procedure for preparing a cylinder liner as shown in FIG. 3 is to bore out the inner surface of the liner and to clean the surface such as by sand blasting. Then a bonding material such as Nichrome is applied to the clean surface to a thickness of approximately 0.002 inch followed by a graded layer of a thermally insulative material, such as yttrium stabilized zirconium oxide. Then the cylinder liner is dipped in a liquid containing silica, chromium oxide and aluminum oxide in a liquid carrier such as an aqueous solution of zinc chromate to form a SCA barrier coating having a thickness of about 0.004 inch. The cylinder liner is then baked at a temperature of about 900° F. and the liner can then be machined to desired dimension. Impregnation of the cylinder liner is then accomplished by dipping it in an aqueous solution of chromic acid followed by heating to a temperature of about 900° F. The impregnation and heating cycles are repeated 5 or 6 times. The cylinder liner can then be honed, if desired.

The choice as to whether or not a barrier coating (SCA coating) is employed prior to impregnation with a soluble chromium compound depends primarily upon the characteristics desired for the liner. When the thermally insulative layer is impregnated directly with the soluble chromium compound, penetration of the impregnant is inherently deeper (FIG. 2) and a very strong bond is achieved with some sacrifice in thermal insulating properties. On the other hand, when the barrier coating (SCA coating) is utilized, the extent of penetration of the soluble chromium impregnant is lessened (FIG. 3) but the thermal insulating properties are enhanced. With the embodiment shown in FIG. 2, thermal conductivity values or k (BTU/hr/$ft^2$) values of about 1.0 are obtainable while with the embodiment shown in FIG. 3, k values on the order of 0.5 are obtainable. Both procedures provide a cylinder liner having excellent characteristics as to low heat conductivity and wear resistance.

The following examples illustrate the formation in accordance with this invention of a piston sleeve or liner for a cylinder in an internal combustion engine.

EXAMPLE 1

This example describes a procedure for fabricating an insulated cylinder liner to provide optimum insulation. A rough cast metal (e.g., iron) cylinder liner is machined to specification. The internal surface of the cylinder liner is rough machined. Then the internal cylinder liner is sand blasted to cleanse the surface of impurities, oil or corrosion.

A bond coating of approximately 0.02 inch thickness is applied by plasma spray. For an iron liner, the bond coating is preferably NiCr and in the case of an aluminum liner the bond coating is preferably NiCrAlY. The metal substrate with the bond coating is now ready for plasma spraying of a thermal barrier coating of $ZrO_2$. For a thick coating, a small percentage of yttria is added and for coatings having a thickness greater than about 0.020 inch the coating is preferably graded. Starting with a less than 10% yttria/$ZrO_2$ composition, the gradation gradually terminates with a $ZrO_2$ outer surface. This plasma sprayed thermal barrier coating of basically $ZrO_2$ is porous and results in a thermal conductivity value of 50 to 60% of monolithic ceramic. The coating is applied to a desired thickness consistent with insulation value desired used with an 0.005 inch overlay. The purpose of the 0.005 inch overlay is to permit machining the cylinder liner inner diameter to dimension. The subsequent $C_2O_3$ and SCA coatings are expected to build up thickness of 0.002 to 0.005 inch.

After the machining operation of the plasma sprayed coated liner, a SCA coating as previously described is applied over the $ZrO_2$ by dipping or spraying. This SCA coating is then baked in an oven for approximately forty-five minutes at 900°-1000° F. Upon removal of the SCA coated $ZrO_2$ cylinder liner, it is now ready for densification with chromic acid.

The SCA surface is now dipped or sprayed with chromic acid solution. The chromic acid treated surface is then baked at a temperature above 850° F. to convert $CrO_3$ to $Cr_2O_3$. The $Cr_2O_3$ gives a dense, hard surface which provides a durable wear surface with a low coefficient of friction. The chromic acid treatment is repeated as many times as needed—usually 5 to 6 times. The SCA coating densified with $Cr_2O_3$ usually does not penetrate the $ZrO_2$ to the metal substrate. The $Cr_2O_3$ surface is now honed and since the SCA or $Cr_2O_3$ treatment does not change dimension, honing is usually adequate without further machining. The cylinder liner is now ready for use in a conventional or an adiabatic engine. The $Cr_2O_3$ coating provides structural rigidity and strength and the surface will be substantially impervious, which is important.

EXAMPLE 2

If it is desired to fabricate a cylinder liner having optimum strength, with some sacrifice in insulative value (no worse than monolithic $ZrO_2$), the steps described in Example 1 are repeated except the SCA coating is not utilized. With this fabricating technique, the $Cr_2O_3$ now infiltrates through the porous plasma sprayed $ZrO_2$ and when it hits the metallic surface, iron chromate will form at the interacting surface which results in extremely high strength bond between the metal substrate, the plasma sprayed $ZrO_2$ barrier and $Cr_2O_3$.

The thermal barrier coated cylinder liners densified with $Cr_2O_3$ as described in Examples 1 and 2 have demonstrated outstanding wear characteristics as well as lower fuel consumption in Cummins Laboratory test engines. After 350 hours of full load operation at 195 bearing profilometer check has shown zero wear. Fuel consumption was also reduced, especially at lower power outputs.

Piston cylinders which do not involve a separate liner are formed in accordance with this invention in similar manner. Thus, the inner surfaces of the cylinder wall are treated as described above followed by machining to the proper cylinder dimension. The concepts of the present invention can likewise be advantageously applied to other combustion chamber components such as cylinder heads, exhaust ports and piston crowns.

With the present invention it is possible to form internal combustion engine components which possess exceptionally low heat conductivity and wear resistance characteristics. In a 5-ton truck test vehicle the cylinder heads, piston crowns and cylinder liners of the vehicle engine were formed in accordance with the present invention. With a 10-ton load the test vehicle was driven for 3,000 miles without conventional air or water cooling means being utilized. The "adiabatic" engine provided significantly improved economy with respect to fuel consumption.

Prior art attempts to improve the heat conductivity and wear resistance characteristics of internal combustion engine components involved the use of relatively thin thermal insulative coatings on the order of about 0.015 inch. In accordance with this invention thermally insulative layers as thick as about 0.125 inch can be formed on engine components with the components exhibiting good structural integrity and wear resistance by virtue of impregnation with a soluble chromium compound in a liquid convertible to chromium oxide as disclosed herein. The surfaces of engine components treated in accordance with this invention are durable and are substantially impervious to penetration by contaminants such as gasoline and lubricating oils. By forming engine components in accordance with this invention, friction therein is significantly reduced thereby improving fuel economy and extending the engine life.

Those modifications and equivalents which fall within the spirit of the invention are to be considered a part thereof.

What is claimed is:

1. A combustion chamber defining component of an internal combustion engine having on a surface thereof a layer of a thermally insulative material with particles of chromium oxide dispersed at least partially therewithin and wherein the thermally insulative material is secured to the surface of the combustion chamber defining component by a coating of a bond material wherein the bond material is an alloy of nickel, iron and chrome.

2. A combustion chamber defining component in accordance with claim 1 wherein the thermally insulative material consists of yttrium stabilized zirconium oxide or magnesia stabilized zirconium oxide.

3. A combustion chamber defining component in accordance with claim 1 which is a cylinder liner.

4. A combustion chamber defining component in accordance with claim 1 which is a piston cylinder wall.

5. A combustion chamber defining component in accordance with claim 1 which is a cylinder head.

6. A combustion chamber defining component in accordance with claim 1 which is a exhaust port.

7. A combustion chamber defining component in accordance with claim 1 which is a piston crown.

* * * * *